United States Patent [19]

Forys et al.

[11] 4,443,743
[45] Apr. 17, 1984

[54] TWO AXIS ACTUATOR

[75] Inventors: Edward L. Forys, Covina; Richard M. Malueg, Glendora, both of Calif.

[73] Assignee: McDonnell Douglas Corporation, Long Beach, Calif.

[21] Appl. No.: 321,257

[22] Filed: Nov. 13, 1981

Related U.S. Application Data

[63] Continuation of Ser. No. 948,795, Oct. 5, 1978, abandoned.

[51] Int. Cl.³ .............................................. H02K 41/00
[52] U.S. Cl. ................................... 318/115; 310/12; 310/36; 336/190
[58] Field of Search .................... 318/36–38, 318/115, 135; 310/12–14, 36, 27, 37; 336/190

[56] References Cited

U.S. PATENT DOCUMENTS

| | | |
|---|---|---|
| 2,843,825 | 7/1958 | Lush . |
| 2,930,014 | 3/1960 | Van Der Hoek et al. . |
| 3,169,241 | 2/1965 | Aiken . |
| 3,373,272 | 3/1968 | Saraga . |
| 3,376,578 | 4/1968 | Sawyer . |
| 3,416,535 | 12/1968 | Kalthoff et al. . |
| 3,418,612 | 12/1968 | Beckwith . |
| 3,459,976 | 8/1969 | Nyman . |
| 3,469,180 | 9/1969 | Anderson . |
| 3,576,359 | 4/1971 | Cosh . |
| 3,641,583 | 2/1972 | Cless et al. . |
| 3,668,443 | 6/1972 | Schwartz . |
| 3,745,433 | 7/1973 | Kelby, Jr. et al. . |
| 3,851,196 | 11/1974 | Hinds . |
| 3,859,615 | 1/1975 | Luton, Jr. et al. . |
| 4,024,552 | 5/1977 | Kondo . |
| 4,051,398 | 9/1977 | Kondo . |

Primary Examiner—Donovan F. Duggan
Attorney, Agent, or Firm—Henry M. Bissell; Walter J. Jason; Donald L. Royer

[57] ABSTRACT

A multiaxis actuator is described which provides force along at least two translational axes through the interaction of multiple windings on a single platen which interact with the field poles of a magnetic member spaced apart a sufficient distance to allow multiaxis operation. Said field poles generate magnetic lines of flux perpendicular to said platen. Said windings are constructed and arranged so as to provide current paths in one direction over a generally wide planar area intercepting the magnetic flux lines, while concentrating current in the opposite direction return path in a relatively narrow volume not intercepting the magnetic flux lines. Said individual windings are utilized in pairs having their substantially planar portions collinear to one another and disposed substantially perpendicular to a portion of the magnetic field lines generated between said field poles. Pairs of such windings so arranged may be mounted on both sides of said platen such that current flowing in a first pair of windings flows in a direction which is disposed transverse of the direction of current flowing in an opposite pair of such windings. Windings so disposed will generate force perpendicular to lines of force generated by said poles and perpendicular to direction of current flow. A wide gap between the poles of the magnetic member allows translational or rotational motion of the platen relative to the field poles without affecting generated force.

12 Claims, 4 Drawing Figures

TWO AXIS ACTUATOR

This is a continuation of application Ser. No. 948,795, filed Oct. 5, 1978, abandoned.

BACKGROUND OF THE INVENTION

The field of this invention relates generally to linear motor and rotational motor structures; more specifically, this invention relates to linear actuators utilized in the isolation of platforms in inertial stabilization systems. Prior art attempts at producing such actuators for such stabilizing systems have been directed primarily to rotational motor systems as well as single axis actuator systems which utilize very narrow gap magnetic elements. This effort has resulted in cumbersome structure which requires an individual rotational motor for each axis of rotation or plurality of individual linear actuators, one for each translational axis of motion desired, or multiple combinations thereof if rotational motion is desired.

SUMMARY OF THIS INVENTION

Since it is the object of isolation platforms to isolate translational as well as rotational motions caused by vibration of the mounting platform which supports the isolation platform, the primary concern becomes one of limiting short stroke motions along numerous axes. Accordingly, actuators used may be short stroke actuators of a translational variety. The actuator armature is mounted on a platen which in turn is connected to the vibrating structure to be isolated, although reverse mounting is possible. The magnets are mounted to the structure to be isolated. The novel structure herein described provides windings on a platen which is disposed between the poles of said magnets. This platen supports windings disposed in a generally planar extent. The elements of such windings traverse the planar area in one direction in a generally collinear configuration and return in the opposite direction in a narrowly grouped volume out-side of the field flux density, thereby providing a return path for current which is disposed about the outer extent of such planar configuration and which occupies minimal volume. It is the planar portion of the windings which is disposed between the magnetic pole pieces such that current in only one direction is present in the magnetic field which provides the desired force. Therefore current may be driven through such windings in a controlled manner well known in the art and is used to generate force along an axis perpendicular to the current flow and perpendicular to magnetic flux lines generated by said poles according to the well known formula:

$$F = n(I \times B)$$

Where:
I = Current flowing in each conductor
B = Magnetic flux density
X = Vector cross product
n = number of conductors
F = Force generated More specifically the platen contains a double winding of the type above described lying adjacent one another to provide a large extent of generally planar windings lying in one direction on one side of said platen and an identical configuration of the opposite side of said platen with the windings disposed transverse to the direction of windings on the opposite side. Thus, translational motion in at least two directions may be provided by simply applying a voltage to said windings which drives current through said windings in one direction. Said windings are imbedded in a solid epoxy medium so as to provide a unitary package having fixed dimensions.

The further principles and advantages of this invention will be more fully understood by reference to the drawings, specifications, and descriptions hereinafter set forth.

SPECIFIC EMBODIMENT

Figure 3:
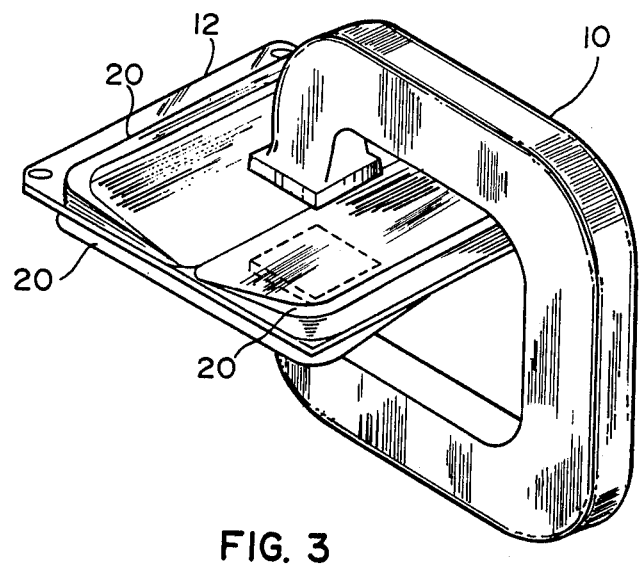
FIG. 3 is a perspective view of a plurality of windings disposed between the poles of the magnetic element.

With reference to the drawings, FIG. 3 shows a wide gap actuator having a magnetic element 10 with a platen 12 disposed between the poles of said magnetic element 10. Attached to either side of said platen is a plurality of windings 20. Said windings are attached to said platen in pairs such that a generally planar portion of said winding is disposed between the poles of the magnetic member 10. The upper windings 20 are disposed generally 90° to lower windings 20. It is to be recognized that the angular displacement between opposite windings need not be precisely 90° but may be any angle between 0° and 180° depending of course upon the particular application and desired directions of applied force. Even a third set of windings or more may be added angularly disposed from the first two, thereby providing yet another axis of force. The number of actual windings, of course, is dependent upon the required number of axes.

Figure 1:
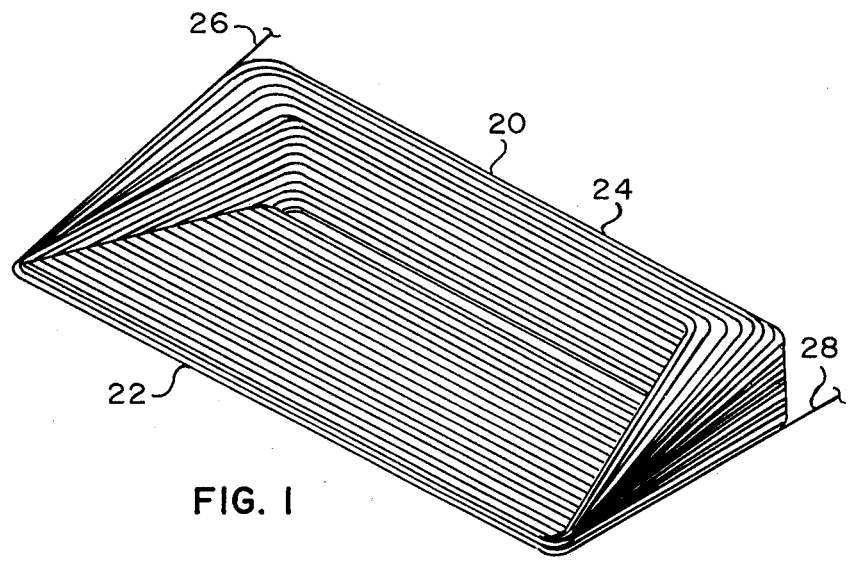
FIG. 1 is a perspective view of a single winding.
Figure 2:
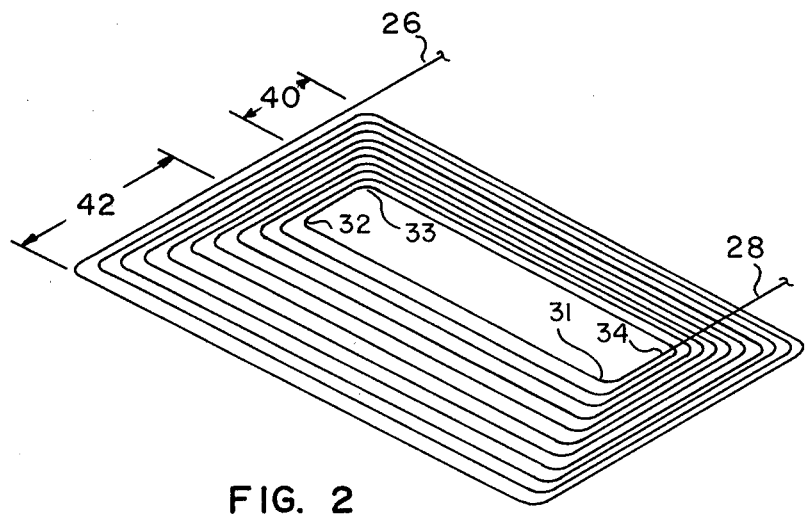
FIG. 2 is a schematic view of the winding of FIG. 1.

The specific configuration of winding 20 is shown in FIG. 1, wherein a generally planar extent 22 is defined on one side of said winding 20 and a general rectangular configuration 24 is defined on the opposite side of said winding 20, the entire winding being fixed in a hard epoxy while allowing input line 26 and output line 28 to provide attachment to a source of electric current. FIG. 2 shows the particular manner in which the winding configuration is created by showing the input line 28 which begins the winding in a conventional manner proceeding to a first bend line 31 and thence at generally 90° to a second bend line 32 and thence at generally 90° to a third bend line 33 and thence generally at 90° to a fourth bend line 34, generally keeping a portion of the winding in the region lying between bend lines 31 and 32 generally parallel to form a flat winding surface of either single or multiple layers. The region between bend lines 33 and 34 is layered such that the windings occupy a generally confined volume and are layered not only in parallel but also both vertically and horizontally adjacent one another in a stacked configuration to form region 24 as shown in FIG. 1. This allows one side of the windings to occupy a small transverse area 40 while the opposite side occupies a large transverse area 42. It is contemplated that large area 42 be disposed between the magnetic field poles of magnetic member 10 while area 40 is without the poles of magnetic member 10 and occupies a minimum volume. The regions of said windings defined between bend lines 32 and 33 and 31 and 34 are the returns of said windings and provide the transition region from planar region 42 to rectangular region 40. It should be recognized, however, that a circular winding could also be used as opposed to the rectangular one herein described so long as current in that portion of the winding which interacts with the magnetic field is transverse to current in opposite windings.

Figure 4:
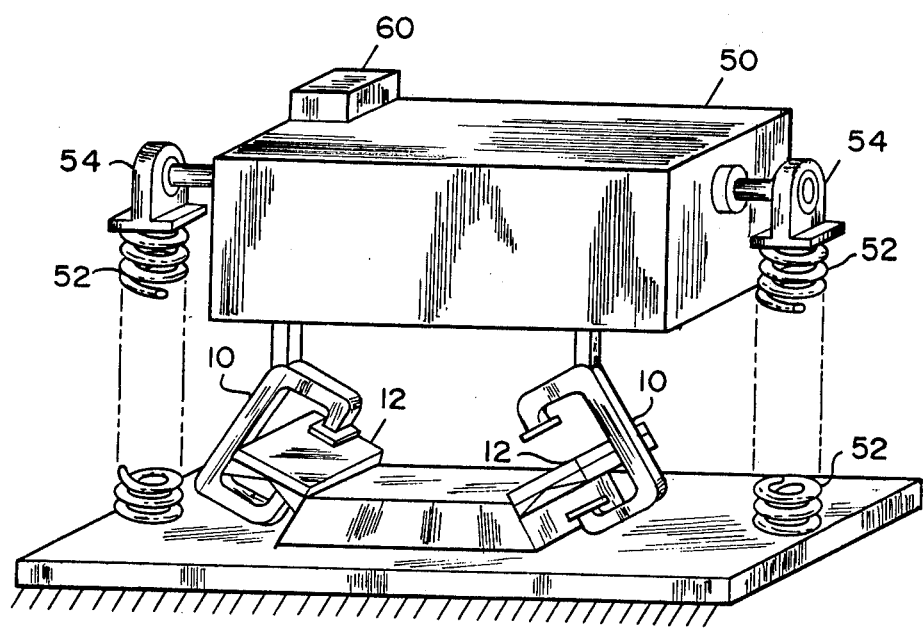
FIG. 4 is an inertial stabilization system showing a pair of multiaxis actuators.

FIG. 4 illustrates the manner in which the multiaxis actuator of the instant invention may be utilized to isolate a platform from mechanical ground. With reference to FIG. 4, a platform 50 is supported by linear decoupling members 52 and angular decoupling member 54 relative to mechanical ground 56. A pair of magnetic members 10 is attached to said platform 50 and angularly disposed of one another. A pair of platens 12 are disposed between the poles of said magnetic members as illustrated in FIG. 3, and attached to mechanical ground 56. It may be readily noted that this configuration allows rotational force as well as translational force to be applied to the platform in order to stabilize the same through the interaction of the actuators.

It is understood that the apparatus motion detection may be any conventional system which provides suitable control means within the state of the art for providing controlled application of current to the windings 20. Typically sensors 60 are mounted on the platform 50 which detect motion of said platform. This motion may be either translational or rotational motions of various magnitudes. The sensors 60 may comprise a gyro which is able to detect relatively low frequency motion such as change in attitude, or an angular accelerometer which is able to respond to high frequency motions occasioned by shocks and vibrations. These sensors then generate signals which are proportional to the motion sensed, which signals are in turn applied to a controller. The controller after suitable servo compensation, applies a current to the windings of the actuator sufficient to generate motion opposing the sensed motion thereby cancelling the same. Further, the poles of magnetic element 10 are spaced apart a distance sufficient to allow some rotational and translational motion of the platen 12 relative to magnetic member 10 which allows complete isolation of the platform from mechanical ground 56 while at the same time leaving the magnitude of force generated unaffected. In other words, the magnitude of force generated by the platen 12 and magnetic member 10 is relatively independent of the change of position of said platen with reference to said magnetic poles caused by vibrational displacement.

What is claimed is:

1. A multiaxis actuator capable of generating force along a plurality of axes for use in inertial stabilization systems comprising:
   a. means for generating a magnetic field between a pair of spaced-apart, opposed magnetic poles;
   b. a platen disposed between the poles and aligned generally orthogonally to said magnetic field;
   c. a plurality of individual current carrying windings attached to said platen and aligned along different selected orientations relative to each other, each winding having a plurality of loops providing current paths with corresponding first sides being disposed in a generally planar configuration along said platen and positioned within a central field region between said poles and with corresponding second sides being stacked in a generally non-planar configuration along an edge of said platen outside said central field region to develop a net reactive force between said field and a magnetic field developed by current in said each winding: and
   d. at least two of said windings being oriented such that the current in either winding flows in a path having a portion thereof transverse to the path of current flow in the other winding.

2. An actuator as claimed in claim 1 wherein said windings are disposed such that said transverse current paths are substantially perpendicular to flux lines of said magnetic field.

3. An actuator as described in claim 2 wherein said windings comprise:
   a plurality of loops of electrically conductive material disposed such that a portion of each of said loops is generally parallel with a portion of adjacent loops forming a generally planar extent.

4. An actuator as described in claim 3 wherein the balance of said loops of electrically conductive material are further disposed in greater dimension than in said planar extent and normal to said planar extent.

5. An actuator as described in claim 1, 2, 3 or 4 wherein said means for generating a magnetic field further comprises:
   a wide gap magnetic element for receiving said windings and having magnetic poles spaced apart a distance sufficient to allow rotation of said windings about an axis generally perpendicular to the lines of flux generated by said poles, without contact with said poles.

6. A force producing apparatus comprising:
   a. a stator having a pair of opposed field poles;
   b. an armature having a generally planar portion mounted between the poles of said stator and generally orthogonal to the stator field;
   c. a plurality of windings fixedly mounted on said armature, each having a planar portion located between the poles for interacting with the field of said stator and a remotely located stacked portion for providing return paths for current in the planar portion, said windings being disposed at angles with respect to each other so that interraction between the stator fields and fields of the windings develops force along a plurality of axes; and
   d. means for conducting current to said windings.

7. A force producing apparatus as described in claim 6 wherein said windings further comprise:
   at least one loop of electrically conductive material having a generally planar configuration in one portion thereof and a larger dimension than said planar configuration in a direction normal to the surface of said planar configuration in another portion of said material.

8. A force producing apparatus as described in claim 7 wherein current paths in the planar portion of at least one of said windings are oriented in a direction transverse of current paths in the planar portion of another winding.

9. A force producing apparatus as described in claim 6 wherein said windings further comprise:
   a plurality of loops of electrically conductive materials, a portion of said loops being substantially parallel with one another and lying in a generally first planar configuration and another portion being grouped so as to lie in a generally second planar configuration transverse of said first planar configuration.

10. A force producing apparatus as described in claim 6 wherein said windings further comprise:
a plurality of interconnected loops of electrically conductive material electrically isolated from one another traversing a first region such that each loop is generally parallel with adjacent loops in ever increasing distance from the center of said loops, and a plurality of interconnected loops traversing a second region in a confined volume.

11. A force producing apparatus as described in claim 6 wherein said windings further comprise:
a continuous loop of electrically conductive material externally insulated and wound about a central region such that a plurality of turns on one side of said continuous loop are disposed in a volume having a small dimension in one direction and a large dimension in another direction and a plurality of turns on another side of said continuous loop are disposed in a volume having at least two dimensions smaller than said large dimension.

12. A force producing apparatus as described in claim 6, 7, 8, 9, 10 or 11 wherein said stator further comprises:
a plurality of magnetic poles spaced apart a distance sufficient to allow rotation of said windings about an axis generally perpendicular to the lines of flux generated between said poles.

* * * * *